United States Patent Office.

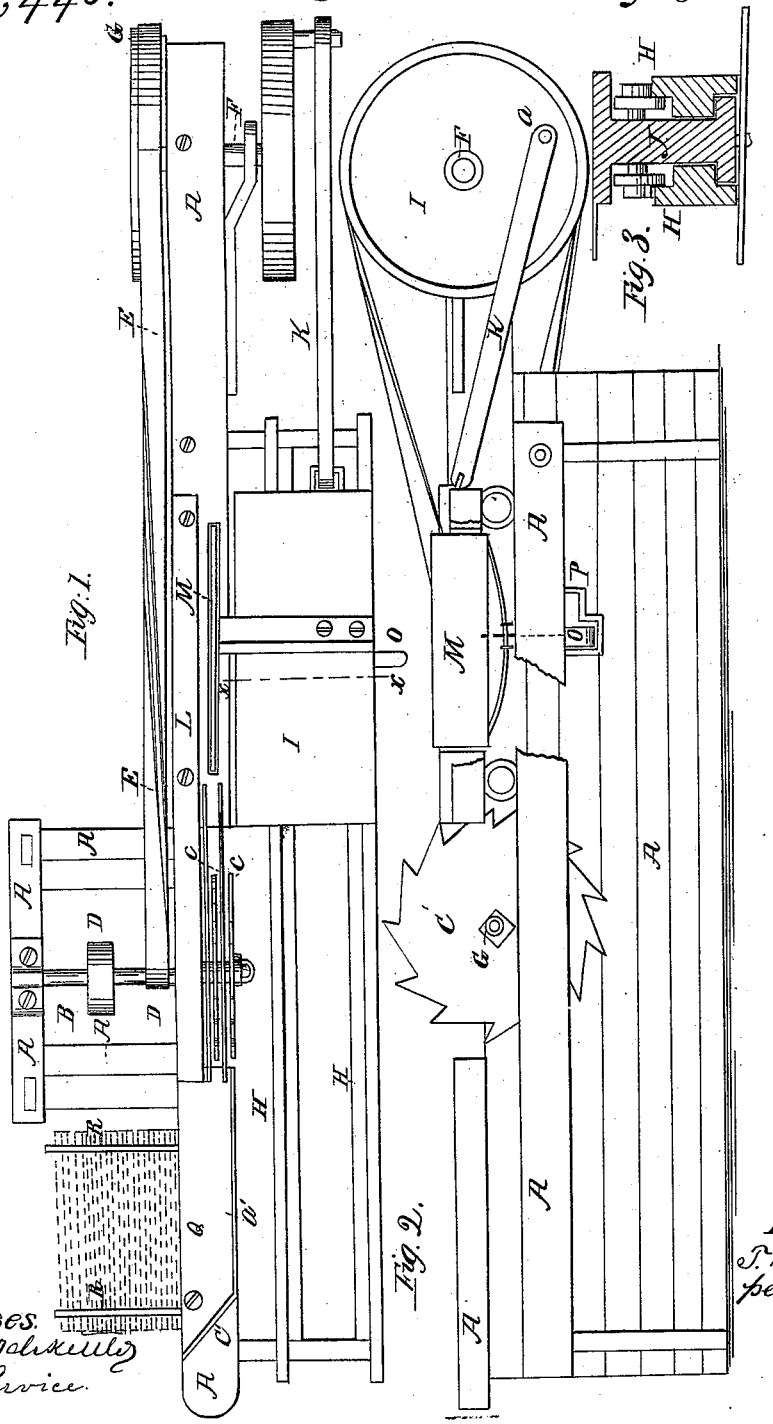

THEODORE BRUNO, OF SAGINAW, MICHIGAN.

Letters Patent No. 77,449, dated May 5, 1868.

---

IMPROVEMENT IN MACHINES FOR SAWING LATH.

---

*The Schedule referred to in these Letters Patent and making part of the same.*

---

TO ALL WHOM IT MAY CONCERN:

Be it known that I, THEODORE BRUNO, of Saginaw, in the county of Saginaw, and State of Michigan, have invented a new and improved Machine for Sawing Bolts, &c.; and I do hereby declare that the following is a full, clear, and exact description thereof, which will enable others skilled in the art to make and use the same, reference being had to the accompanying drawings, forming part of this specification.

This invention relates to a new and improved method of constructing machinery for sawing bolts or laths, or other strips, from planks or boards, whereby time and labor are economized.

It consists in the construction, arrangement, and combination of the several parts, as shown and hereinafter more fully set forth.

In the accompanying plate of drawings—

Figure 1 is a plan view of my invention.

Figure 2 is a side elevation of the same.

Figure 3 represents a cross-section of the same, taken in the line $x\ x$, fig. 1.

Similar letters of reference indicate corresponding parts.

Upon any suitable frame, A, and rotating in suitable bearings upon the same, is a saw-mandrel or arbor, B, having upon the inner end of said arbor two or more circular saws C. The saws C are secured to the mandrel B in the ordinary way, and are placed at such distance from each other as that, when in operation, they will saw strips of the required width.

The mandrel B is furnished with the necessary pulleys D, by means of which the saws C are driven, and to communicate motion, through a belt, E, and pulley G, to a shaft, F, rotating in suitable bearings on the end of the frame A, as shown.

Upon suitable parallel horizontal strips, running lengthwise of the frame A, are the rails H, to support and guide the feed-carriage I. The feed-carriage I is made in the ordinary manner of constructing feed-carriages for sawing-machines now commonly in use, and is held upon the rails A by gibs, or in any other convenient way. The rails H are laid at right angles to the mandrel B, and are of such height as to bring the top of the carriage as nearly as possible to the centre of the saws C.

Upon the inner end of the shaft F is keyed a wheel, J. The carriage I is connected to the wheel J by a connecting-rod, K, said connecting-rod K being pivoted to the centre of the carriage I at one end, and connected with the wheel J at the other end, by means of the crank-pin $a$, as shown, by means of which connection a reciprocating rectilinear motion is given to the carriage I, from the continuous rotating motion of the mandrel B, which is an important feature of the present invention, since planks or boards are thus fed up to the saws C, and withdrawn without effort to the operator.

A second important feature of my invention consists in the manner of gauging the width of the strips to be sawed, whereby one or more strips may be sawed from the plank at pleasure.

Upon the frame A is a gauge, L, so situated, with respect to the saws C, as that two or more strips, of a given width, will be sawed from the plank at the same time, according to the number of saws. Between the gauge L and the inner face of the inner saw C is a movable guage, M, the inner edge of which is in a line with the inner face of the outer saw. The gauge M is a rectangular strip, supported by a spring, N, and is permitted a sufficient vertical motion, in a longitudinal slot in the frame A, so that said gauge M may be wholly withdrawn below the level of the top of the carriage I.

The spring N holds the gauge M up sufficiently to guide the plank or board to be cut; and when so held, only one strip will be sawed from said plank.

To the under side of the strips on which the rails H are laid, is pivoted a lever, O, the shorter arm of said lever O being connected with the gauge M by a connecting-rod, as shown, by means of which said lever O, the gauge M is drawn down, against the force of the spring N, to the level of the carriage I, any suitable catch, P, being attached, in convenient position, in the frame A, to hold the longer arm of the lever O up, said catch P being so formed as to allow the longer arm of the said lever O to be released, when the gauge M will be forced up through the frame A by the spring N. The spring N may be of any suitable form, as semi-elliptic, shown in the drawing.

A third important feature of my invention consists in the manner of catching and holding the strips, laths, or bolts, after the same have been sawed from the board or plank.

Upon the top of the frame A, behind the saws, is a metallic plate, 2, furnished with a guiding-rim, $a'$. Said rim $a'$ is bent outwards from the machine, as shown in the drawing, fig. I.

Near the end of the frame A, on the side of the same, and under the guiding-plate Q, are two metallic hooks R, as shown, so bent as to receive and hold the strips, bolts, or laths which have been sawed from the plank or board.

The operation is similar to that of other machines for sawing laths now commonly in use, the present invention being self-feeding, furnished with a double gauge, and means of catching the laths or bolts after being sawed, as above described.

I claim as new, and desire to secure by Letters Patent—

The gauge M, working in the longitudinal slot in front of the guide L, and resting upon the spring N, operated by the lever O, whereby the number of strips to be cut from the board at one operation is regulated, as herein shown and described.

THEODORE BRUNO.

Witnesses:
    J. H. SUTHERLAND,
    CHILTON D. BURDICK.